A. E. HENDERSON.
INFLATION VALVE FOR PNEUMATIC TIRES.
APPLICATION FILED AUG. 20, 1915.
1,160,712. Patented Nov. 16, 1915.
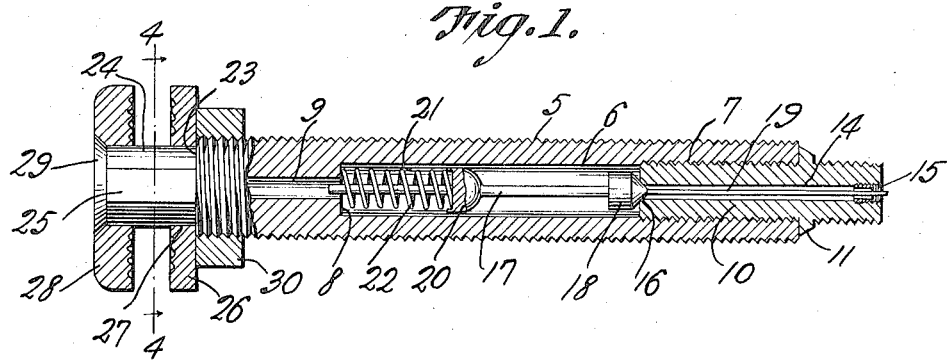
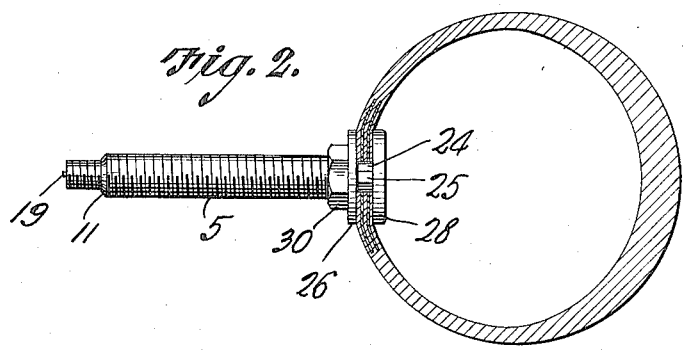
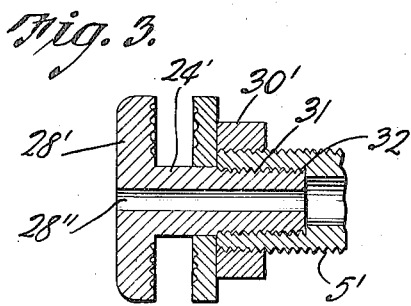
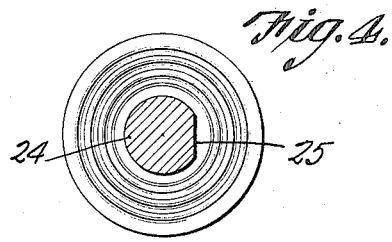
Witnesses
Ed. R. Lusby
E. T. Burnett
Inventor
Albert E. Henderson
By David P. Moore,
Attorney

UNITED STATES PATENT OFFICE.

ALBERT ENNIS HENDERSON, OF TORONTO, ONTARIO, CANADA, ASSIGNOR TO SUPERIOR TUBES AND ACCESSORIES, LIMITED, A CORPORATION OF CANADA.

INFLATION-VALVE FOR PNEUMATIC TIRES.

1,160,712.         Specification of Letters Patent.      Patented Nov. 16, 1915.

Application filed August 20, 1915. Serial No. 46,427.

*To all whom it may concern:*

Be it known that I, ALBERT ENNIS HENDERSON, a subject of the King of England, residing at Toronto, in the county of York, Province of Ontario, and Dominion of Canada, have invented certain new and useful Improvements in Inflation-Valves for Pneumatic Tires, of which the following is a specification, reference being had therein to the accompanying drawing.

This invention relates to improvements in inflation valves for pneumatic tires, one object of the invention being the provision of a valve in which the clamping members are so disposed having to have only limited movement relatively to each other, the fixed member being insertible through the opening in tube from the exterior of the tube, so that the body of the tube may fit in between both clamping members to be locked therein by the usual locking nut mounted upon the stem. This particular stem is designed for use in connection with the stem connection shown and set forth in my copending application filed even date herewith Serial No. 46,426.

In the accompanying drawings:—Figure 1 is a longitudinal sectional view of the complete valve and stem. Fig. 2 is a cross section through an inner tube with the stem in place. Fig. 3 is a sectional view of a modified form, and Fig. 4 is a section taken on line 4—4 of Fig. 1.

Referring to the drawings, the numeral 5 designates the body of the member, which is provided with the main bore 6, the interiorly threaded portion 7, the shoulder 8 and the reduced bore 9. The valve seat carrying member 10, is provided with the annular shoulder 11, which coöperates with the end of the stem 5 to limit the inward projection of the member 10, which is provided with the bore or channel 14, and with the usual spider 15 in its outer end. At the opposite end of the bore 14 is formed the seat 16, for the valve 18, which in turn is carried by the stem 17, which also carries the button 20. This button 20 is cupped to receive one end of the coiled spring 22, which surrounds the stem 21 also carried by the button, and is limited in its compressibility by the shoulder 8, against which it is held by the action of the member 10 upon the valve 18. The valve operating rod 19 has one end screwed into the valve 18, and projects through the bore 14 in ready access so that the valve may be manually unseated when desired.

The body 5 is reduced as at 24, to provide the limiting shoulder 23, one face of the portion 24 being flattened as at 25, so that the clamping member or disk 26 with the irregular shaped opening 27 may fit thereon and be held from turning, while permitted a limited longitudinal movement. The fixed head, disk or button 28 is riveted or burred as at 29 upon the end of the portion 24, after the member 26 is in place, and thus such member 26 is at all times held upon the portion 24.

The opposed faces of the members 26 and 28 are provided with concentric corrugations which provide a non-slipping gripper for the body of the tube, as shown in Fig. 2. This particular stem is adapted for use in connection with the structure shown in my copending application Serial No. 46,426, wherein the stem is illustrated in course of insertion from the exterior of the tube, the button being forced through the stem receiving opening of the tube and the material of the tube being clamped between the button 28 or 28' and the member 26 or 26'.

In the construction shown in Fig. 3, the body 5' is provided with the interiorly screw threaded bore 31, for the reception of the threaded portion 32 of the stem 24', which has the integral disk or button 28', and is provided with the bore 28", the member 26' being placed upon the stem 24', before the same is screwed into the position as shown.

In both instances the lock nuts 30 and 30', are carried upon the bodies 5 and 5', and after once placed thereon do not have to be entirely removed, as is the usual custom with the stems which employ the clamping member that slips over the body of the stem for coöperation with the head 28 or 28'.

What I claim, as new, is:—

The combination with a pneumatic rubber tube having a stretchable valve stem receiving opening, of a valve stem, the body of which is exteriorly screw threaded and provided with a reduced cylindrical end providing a limiting shoulder, a movable disk having an aperture fitting snugly yet slidably upon such reduced end of the stem, a fixed disk mounted upon the terminal of the reduced end, the opposed faces of the two disks being parallel, and a locking member mounted upon the threaded portion of the body for moving and holding the movable disk toward the fixed disk, whereby the material of the tube about the opening will enter the space between the disks and about the reduced end of the stem and will be held uniformly when clamped between the disks.

In testimony whereof I affix my signature.

ALBERT ENNIS HENDERSON.